March 31, 1964

P. H. SMITH 3,127,579

ROTARY JOINT USING CIRCUMFERENTIALLY UNIFORM
FIELD TO COUPLE ROTOR TO STATOR

Filed Aug. 7, 1962

INVENTOR
P. H. SMITH
BY
ATTORNEY 3,127,579
ROTARY JOINT USING CIRCUMFERENTIALLY UNIFORM FIELD TO COUPLE ROTOR TO STATOR
Phillip H. Smith, Murray Hill, N.J., assignor to Bell Telephone Laboratories, Incorporated, New York, N.Y., a corporation of New York
Filed Aug. 7, 1962, Ser. No. 215,460
3 Claims. (Cl. 333—98)

This invention relates to a rotary joint for feeding electromagnetic energy from a fixed source to a rotating load such as a directive antenna.

An object of the invention is to eliminate commutation or ripple effect in the impedance presented by a rotary joint to a fixed source. A further object is to permit axially stacking two or more rotating loads which may rotate at different rates.

When a rotating load, such as a directive, rotating antenna, is fed electromagnetic energy from a fixed source, a rotary joint must be inserted in the wave guide connecting the source to the load. It is desirable that the impedance presented to the fixed source be constant, regardless of the rotation of the load. Also, it is desirable to be able to stack two or more rotating loads one above the other and feed them from individual fixed sources located at one end of the stack.

The rotary joint in accordance with the present invention comprises a ring-shaped stator and a ring-shaped rotor coaxially and adjacently positioned and having opposed planar faces of the same size. The stator and rotor each comprise a series of like horns with keystone-shaped mouths terminating in and substantially filling the opposed face. A fixed source supplies electromagnetic wave energy of the same frequency and phase to the horns associated with the stator. There is thus established at the mouths of the stator horns an electric field pattern which is substantially uniform circumferentially. The output energy from the stator horns is transmitted via the electric field component of the electromagnetic wave energy across a narrow gap and picked up by a similar set of horns associated with the rotor. The output energy from all of the rotor horns is collected and combined in phase and fed to the rotating load. Since the electric field in the annular gap is uniform, and since all of this energy is collected and fed to a load of constant impedance, the input impedance of the rotary joint is the same for all angular positions of the load. Thus, commutation or ripple effect in this impedance is avoided.

The rotary joint is well adapted for use in axially stacking two or more rotating loads which may have the same or different rates of rotation. All of the fixed sources may be located at one end of the stack. Each of the feed lines between source and load includes a rotary joint. The feed line to the second rotary joint easily passes through the circular central openings in the stator and rotor of the first rotary joint.

Figure 1:
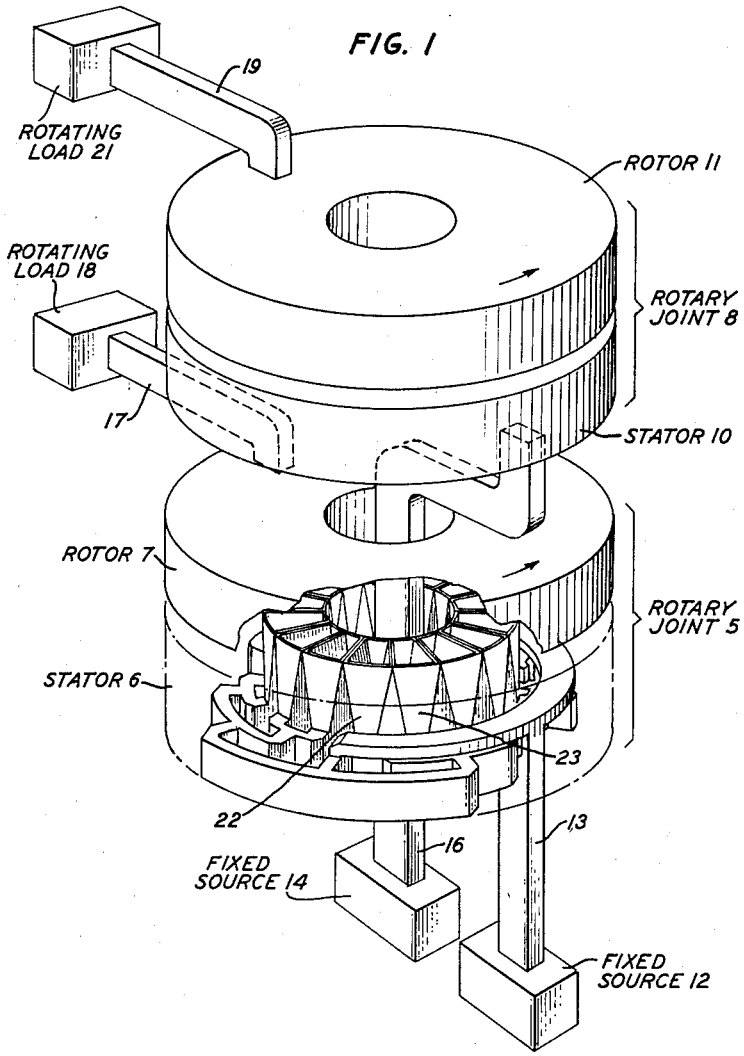
Figure 2:
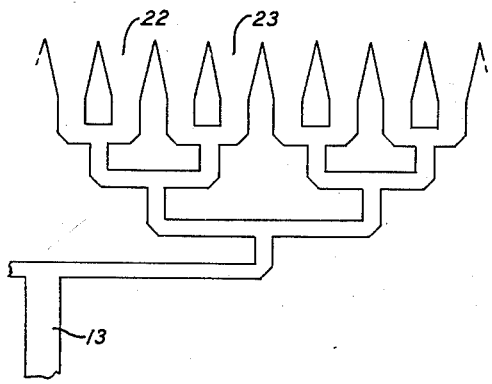

The nature of the invention and its various objects, features, and advantages will appear more fully in the following detailed description of a typical embodiment illustrated in the accompanying drawing, of which FIG. 1 is a perspective view partially broken away to show internal detail of two axially-stacked rotary joints in accordance with the invention; and FIG. 2 is a schematic development of half of the branching waveguide structure used to connect a fixed source with a stator or a rotating load with a rotor.

A first rotary joint 5 comprising a stator 6 and a rotor 7 is axially stacked below a second rotary joint 8 comprising a second stator 10 and a second rotor 11. Additional rotary joints may be axially stacked above 8. Each of the stators and rotors is ring-shaped. A first fixed source of electromagnetic wave energy 12 feeds the stator 6 through a wave guide 13 and a second fixed source 14 feeds the stator 10 by means of a wave guide 16 which passes through the circular central openings in the stator 6 and the rotor 7.

After crossing the air-gap between the stator 6 and the rotor 7, all of the energy from the source 12 is collected in the wave guide 17 and conducted in phase to the first rotating load 18, which may be a directive antenna. Similarly, the output energy from the second rotor 11 is collected in the wave guide 19 and conveyed in phase to the second rotating load 21.

The stators 6, 10, and the rotors 7, 11, are all practically identical. As shown, the stator 6 comprises 16 identical flared horns such as 22 and 23 with keystone-shaped mouths which terminate in and substantially fill the upper face of the stator. These horns are fed in phase by the wave guide 13 which branches and rebranches three times to provide a connection to each horn. A schematic development of the right half of this branching system is shown schematically in FIG. 2.

The rotary joint 5 is completed by the rotor 7, which is substantially the same as the stator 6 but is turned upside down and positioned coaxially over the stator 6 to allow a small air gap therebetween. A branching wave guide such as shown in FIG. 2 collects all of the output energy at the throats of the horns of the rotor 7 and conveys it in phase through the guide guide 17 to the rotating load 18.

The rotary joint 8 substantially duplicates the joint 5. The stator 10 and the rotor 11 each have approximately the same construction as shown in detail in FIGS. 1 and 2.

It is to be understood that the above-described arrangement is only illustrative of the application of the principles of the invention. Numerous other arrangements may be devised by those skilled in the art without departing from the spirit and scope of the invention.

What is claimed is:

1. A rotary joint comprising a ring-shaped stator and a ring-shaped rotor coaxially and adjacently positioned, having opposed planar faces of the same size, and each comprising a series of like horns with keystone-shaped mouths terminating in and substantially filling the opposed face, means for supplying electromagnetic wave energy of the same frequency and phase to one series of horns, and means for connecting all of the other series of horns to a common load.

2. A rotary joint adapted to connect a fixed source of electromagnetic waves to a rotatable load comprising a stator, a rotor, a first branching wave guide adapted to connect the source to the stator, and a second branching wave guide adapted to connect the rotor to the load, the stator and the rotor each being ring-shaped, having a planar face, and including a plurality of horns with keystone-shaped mouths terminating in and substantially filling the planar face, the stator and rotor being coaxially positioned with the planar faces opposed but separated to form an air-gap, the first branching wave guide being connected to the throats of the horns in the stator, and the second branching wave guide being connected to the throats of the horns in the rotor.

3. In combination, two fixed sources of electromagnetic wave energy, two rotating loads, a wave guide connecting each source to its associated load, and two rotary joints, each of the joints being associated with a different one of the wave guides, each of the joints comprising a stator and a rotor, each stator and its corresponding rotor being of the same size and similar construction and each being ring-shaped with a planar face and including a series of like horns with keystone-shaped mouths terminating in and substantially filling the planar face, the stator and rotor of each joint having their planar faces opposed to form an air-gap, the joints being axially stacked, and one of the wave guides passing through the central opening in the stator and rotor of one of the joints.

References Cited in the file of this patent

UNITED STATES PATENTS

| | | |
|---|---|---|
| 2,461,005 | Southworth | Feb. 8, 1949 |
| 2,540,839 | Southworth | Feb. 6, 1951 |
| 2,737,633 | Tomeyasu | Mar. 6, 1956 |
| 2,826,742 | Hollis et al. | Mar. 11, 1958 |
| 2,895,134 | Sichak | July 14, 1959 |